United States Patent [19]

Waddington et al.

[11] Patent Number: 5,067,454
[45] Date of Patent: Nov. 26, 1991

[54] SELF COMPENSATING FLOW CONTROL LUBRICATION SYSTEM

[75] Inventors: Clive Waddington, Stratford; Normand L. Lagasse, Milford; Roger Taupier, Orange, all of Conn.

[73] Assignee: Avco Corporation, Providence, R.I.

[21] Appl. No.: 366,786

[22] Filed: Jun. 14, 1989

[51] Int. Cl.$^5$ ............................................. F01M 1/00
[52] U.S. Cl. .............................. 123/196 S; 364/510; 123/196 AB
[58] Field of Search ........................ 364/510, 509; 123/196 R, 196 AB, 196 S

[56] References Cited

U.S. PATENT DOCUMENTS

| | | | |
|---|---|---|---|
| 2,317,745 | 4/1943 | Duckstein | 123/196 R |
| 3,477,545 | 11/1969 | Durnan | 184/6.4 |
| 3,477,546 | 11/1969 | Gruber et al. | 184/6 |
| 3,486,582 | 12/1969 | Carter et al. | 184/6.3 |
| 3,500,960 | 3/1970 | Jaggi | 184/6 |
| 3,856,114 | 12/1974 | Zankl | 184/6.1 |
| 4,399,774 | 8/1983 | Tsutsumi | 123/196 AB X |
| 4,445,168 | 4/1984 | Petryszyn | 364/505 X |
| 4,512,298 | 4/1985 | Hayashi | 123/196 R |
| 4,531,485 | 7/1985 | Murther | 123/196 S |
| 4,616,609 | 10/1986 | Münch et al. | 123/196 AB |
| 4,854,276 | 8/1989 | Elsbett et al. | 123/196 AB |

Primary Examiner—Parshotam S. Lall
Assistant Examiner—S. A. Melnick
Attorney, Agent, or Firm—Perman & Green

[57] ABSTRACT

An automatic self compensating flow control lubrication system for continuously supplying the requisite amount of lubricant to at least one component of a drive system. One or more operating parameters, such as scavenge temperature, are continuously monitored and the information provided to a computer. The computer operates the first stage solenoid valve of a two stage valve assembly which provides such an amount of lubricant to the component as is necessary to maintain a predetermined value of the operating parameter. Scavenge temperature is one such operating parameter.

17 Claims, 5 Drawing Sheets

SELF COMPENSATING FLOW CONTROL LUBRICATION SYSTEM

BACKGROUND OF THE INVENTION

1. Field of the Invention

The present invention relates generally to drive systems and, more particularly, to an automatic self compensating flow control lubrication system for continuously supplying the requisite amount of lubricant to at least one moving component of a drive system.

Throughout the disclosure, the term "oil" will be employed in a general sense to mean any suitable lubricant, whether natural or synthetic, and whether mineral, vegetable, animal, or petroleum.

Present lubrication systems of the type used, for example, in drive systems for gas turbine engines are designed to supply a near constant oil pressure to fixed jets in the various engine components which require lubrication including bearing package, gears and the like. The system is designed to supply the minimum flow required for the worst case, typically, maximum power at sea level with the most unfavorable jet size and temperature conditions. This philosophy inevitably leads to excessive flow conditions in most other engine operating modes. Deteriorating system conditions, such as clogging jets, cannot be corrected and require operator attention with the possibility of mission cancellation.

In addition to the primary flow functions of the system, present configurations include some diagnostic and condition monitoring provisions. However, these are mainly warning lights and/or gages which require crew attention and only add to the operator workload.

SUMMARY OF THE INVENTION

It was in response to the need just related that the present invention has been conceived and reduced to practice. The disclosed invention relates to an automatic self compensating flow control lubrication system for continuously supplying the requisite amount of lubricant to at least one component of a drive system. One or more operating parameters, such as scavenge temperature, are continuously monitored and the information provided to a computer. The computer operates the first stage solenoid valve of a two stage valve assembly which provides such an amount of lubricant to the component as is necessary to maintain a predetermined value of the operating parameter. Scavenge temperature is one such operating parameter.

A number of general objectives have been sought and satisfied by the invention. In addition to the primary objective of continuously supplying the proper amount of lubricant to a drive system component under all operating conditions, the invention serves to:

eliminate unnecessary parasitic power losses, for example, the power required to rotate bearings, seals, and the like; these losses are greater with high rates of oil flow than with low flow rates; hence the effort to reduce oil flow to a minimum;

provide compensation for changing flow conditions resulting from component deterioration;

eliminate nuisance alarms to operators;

remove the necessity for operator monitoring of oil pressure and temperature; and provide greater manufacturing tolerances for lubricant jets.

To achieve the foregoing objectives, a closed loop feedback system was determined to be appropriate together with an electronic management system to handle both diagnostics and flow control.

In operation, a microprocessor monitors the input signals, which are indicative of engine operating parameters such as gear load, shaft speed and altitude, and changes the output signal to a control valve based upon an input algorithm for best flow. According to this arrangement, no signal change is made if all input conditions satisfy "best flow" or flow corrective signals are instituted if improper "best flow" via fault detection exists. Additionally, various input signals are conveyed to the microprocessor for engine condition monitoring. In this arrangement, the output signal is directed to either a cockpit alarm or maintenance panel, depending upon the nature and severity of a detected fault. Should the lubrication system of the invention be used in an aircraft, it is considered desirable for the microprocessor to be integrated into the electronic fuel control for the aircraft and to use many of the same components and subsystems employed by the electronic fuel control.

The system of the invention uses a fully sensory input, such as scavenge oil temperature. In this instance, system oil is supplied to a two-stage, electrically operated proportional oil flow control valve. The oil flow control valve is a two stage unit which has a proportional solenoid as the "first" or "pilot" pressure stage. The main metering section of the valve utilizes a balanced spool arrangement and requires full spool travel to achieve minimum to maximum design flow while connected in series with a specific bearing package or other oil-receiving component. When operating in tandem with a bearing package, the design will produce a progressive flow change that is directly associated with metering spool travel. Another valve design feature is the incorporation of a fixed minimum flow orifice which bypasses the main metering spool section and prevents full oil shutoff.

The electrical proportional valve feeds a controlled pressure to the end of the main engine flow metering spool. This pressure is balanced by a spring in the vented chamber at the other end of the spool and the flow to the bearing package is controlled by the position of the main spool metering land with respect to the hole in the sleeve. In operation, when the fuel control electronics receives a signal with which the bearing package condition sensor is satisfied, the electrical output positions the solenoid valve in the null position maintaining the pressure/spring balance across the main spool and thus providing the required oil flow to the bearing package. When an error signal is received, the pilot spool is repositioned electrically, changing the pressure/spring balance on the main spool and thus changing the flow to the package to meet the new requirements. This flow will then satisfy the bearing package sensor requirements. The pilot valve will again achieve the null condition, and the main spool will remain in the new position until an error signal is again received. In this manner, the flow to the bearing package is controlled at all times to the value required to satisfy the package condition sensor.

A power module supplies a dithered driver current to operate the first stage of the oil flow control valve in response to an input signal. This dithered control signal minimizes hysteresis which can be inherent in low pressure proportional valving. The control signal is computer generated by an algorithm which, as previously mentioned utilizes a scavenge oil thermocouple input.

A computer program was developed which accepts package oil temperature input, calculates deviation from a target scavenge temperature, 250° F., for example, and continually modulates an output signal for control valve flow manipulation. This insures optimum oil flow at all power, speed, and environmental situations, including lubrication system deterioration. The program features calculations for a variable output signal, the level of which is dependent upon how close the input scavenge temperature is to 250° F. Rate of input temperature change is also monitored and causes an immediate full flow signal output if the change exceeds a level of 5° F./second, for example. Failsafe features of the program address electrical signal disruption from an input sensor or power supply. In either failure scenario, the computer outputs 0 volts to the control, which in turn puts the system into maximum flow operation.

Other and features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Figure 1:
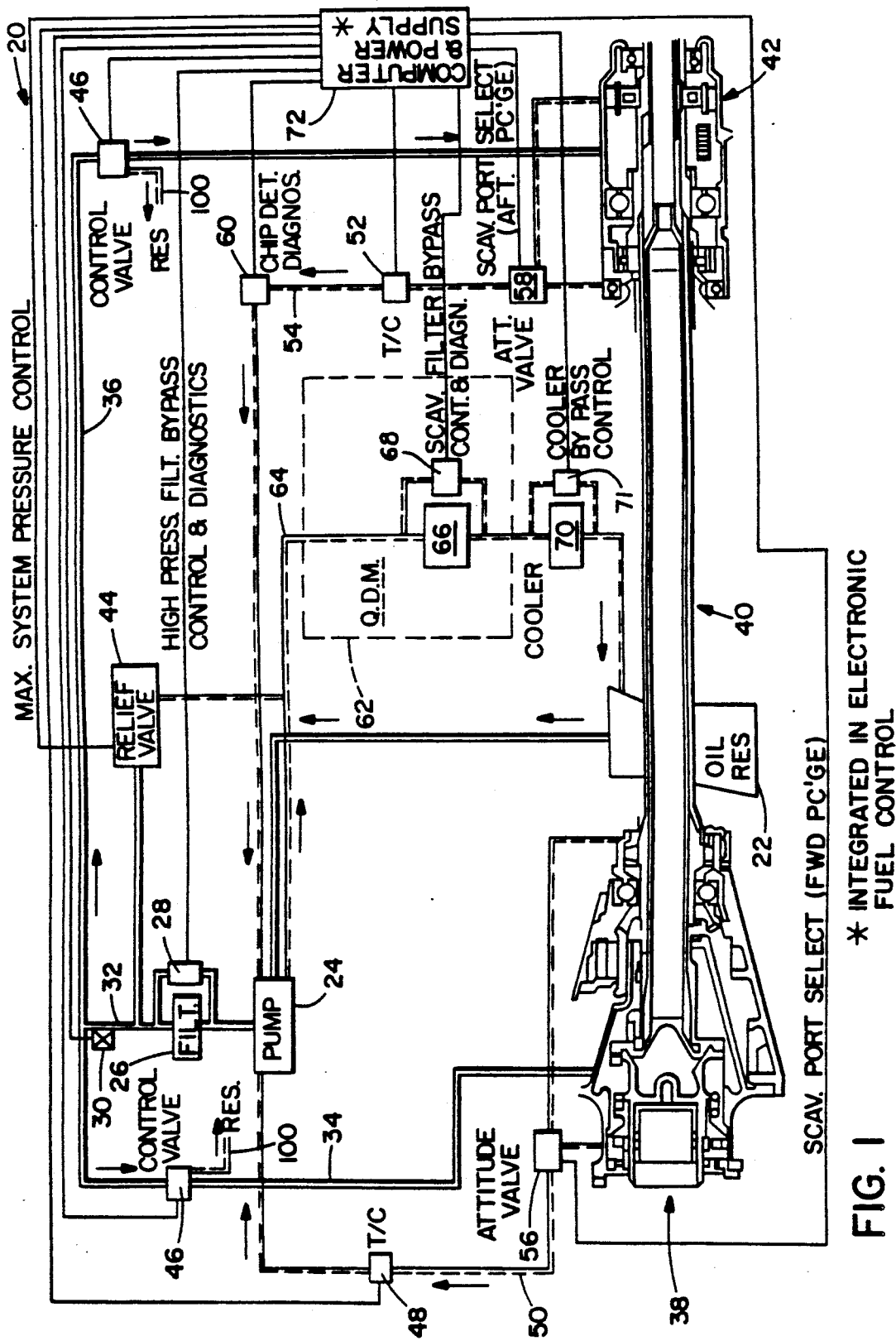
FIG. 1 is a schematic diagram depicting an automatic lubrication system embodying the invention as utilized, by way of example, in conjunction with a drive system for a helicopter.

Turn now to the drawings and, initially, to FIG. 1, which is a schematic illustration of a lubrication system 20 embodying the present invention. While the lubrication system 20 is illustrated in combination with a drive system intended for a helicopter, it must be understood that the invention need not be so limited. Indeed, it may be utilized in combination with any high performance drive system.

In the operation of the lubrication system 20, oil or other suitable liquid lubricant, is drawn from a reservoir 22 by means of a suitable pump 24 through a cleanable filter assembly 26 which incorporates a controlled bypass valve 28 which, together with the filter assembly 26 is an integral part of the pump assembly. The bypass valve 28 allows essentially dirty oil to be supplied to the components of the drive system requiring lubrication in emergency situations during which the filter 26 is clogged. Alternatively, it operates to continue flow of oil during cold weather starting when the oil is too viscous to pass through the filter. A computer controlling operation of the lubrication system, as will be described subsequently, controls whether and when the bypass valve opens. In contrast, existing systems open and close the bypass valve at fixed points which have the effect of reducing filter life. By only opening when absolutely necessary, filter life and life of the drive system are increased by reducing the time that dirty oil is supplied to the components requiring lubrication.

Oil pressure is measured with a suitable pressure transducer 30 located immediately downstream of the pump 24 in a main lubrication line 32 before it is divided into a pair of branch lines 34 and 36, respectively. Branch lubrication line 34 serves to direct oil to a forward bearing package 38 for a drive system 40 and branch lubrication line 36 serves to deliver oil to an aft bearing package 42 for the drive system 40. Protection against excessive pressure in the system 20 is afforded by a relief valve 44.

Oil is delivered to the bearing, seal, and gear lubrication points of the forward and aft bearing packages 38, 42 through suitable oil jets. A two-stage, electrically operated proportional oil flow control valve mechanism 46 is provided in each of the branch lubrication lines 34, 36 and operates in a manner to be described, to provide its associated bearing package with precisely the amount of lubricant necessary to maintain a predetermined value of an operating parameter, for example, scavenge temperature.

Positive oil scavenging from each of the bearing compartments of each of the bearing packages 38, 42 is achieved by internal bearing compartment design coupled with forward and aft compartment scavenge pumps. A thermocouple 48, or other suitable temperature measuring device is located in a scavenge line 50 intermediate the forward bearing package 38 and the pump 24. Similarly, a thermocouple 52, or other suitable temperature measuring device, is located in a scavenge line 54 intermediate the aft bearing package 42 and the pump 24. A diagnostic chip detector 60 is illustrated in the scavenge line 54 capable of detecting debris larger than a predetermined size. Although not shown, a similar detector may be employed in the scavenge line 50.

A full flow conditioner and debris monitor assembly 62 is provided in a return line 64 intermediate the pump 24 and the oil reservoir 22. This assembly includes a maximum system filter and a full flow chip detector assembly which is designed to count particles, particle generation rates, and provide a discriminating system to differentiate between nuisance and significant wear debris. A debris monitor serves to provide early detection of component deterioration and to eliminate unscheduled maintenance because of nuisance actuations. As in the instance of the filter assembly 26, the filter assembly 66 is also provided with a suitable filter bypass 68 which enables flow of oil to continue through the system even when the filter assembly 66 is no longer able to do so.

Oil is cooled by an air-oil heat exchanger 70 following which the oil is deposited into the oil reservoir 22 for deaeration and recycling. A cooler bypass valve 71 is provided in a parallel configuration with the heat exchanger 70. The cooler bypass valve desirably allows rapid heating of the oil on start up and controls the oil inlet temperature up to the capacity of the heat exchanger.

The numerous functions which must be performed by the flow management and diagnostics system of the invention indicates a preference for a closed lube feedback system. In keeping with the invention, an electronic management system is utilized to perform both diagnostics and control functions. An operational schematic flow diagram of a hypothetical flow management system is provided in FIG. 2 which presents a variety of sensor input possibilities which might be considered for oil flow management. In operation, a microprocessor monitors the input signals, which are indicative of a plurality of engine operating parameters such as gear load, shaft speed, and altitude, and changes the output signal to the control valve based upon and input algorithm for best flow. This is shown in the flow chart where no signal change is made if all input conditions satisfy "best flow" or flow corrective signals are instituted if improper "best flow" via fault detection exits.

Figure 3:
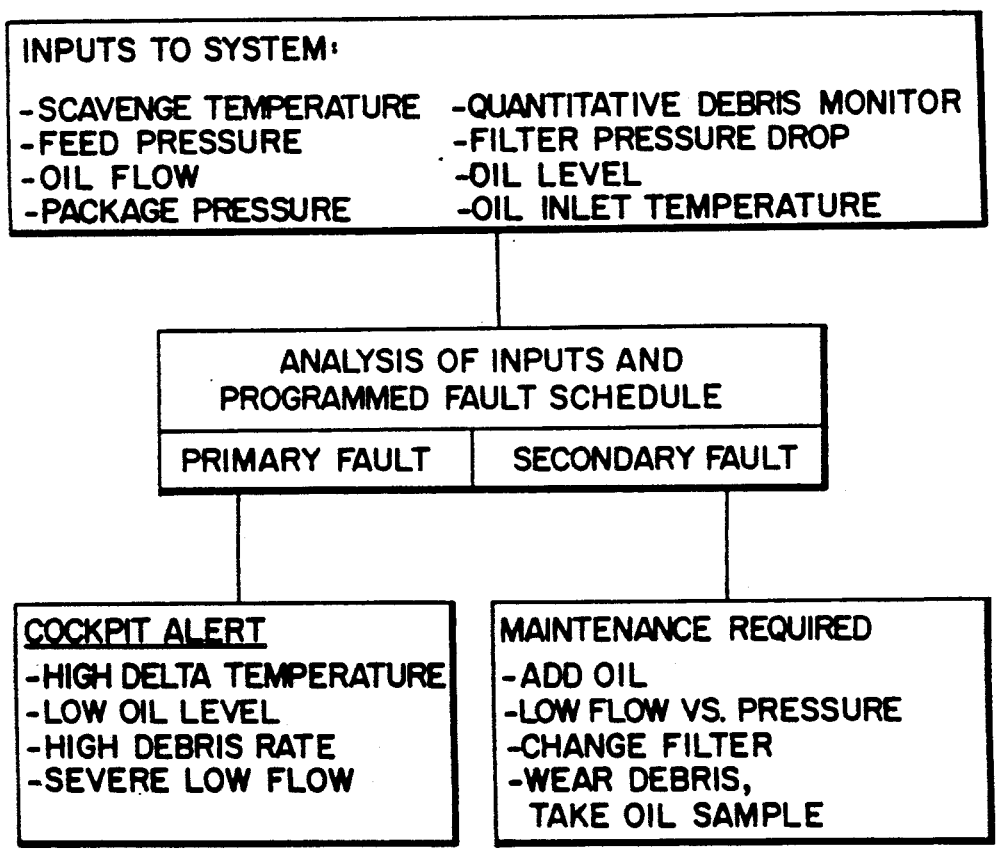
FIG. 3 is a schematic flow diagram of the operation of a diagnostic system which may be utilized with the automatic lubrication system illustrated in FIG. 1.

FIG. 3 is a similar schematic flow diagram which illustrates the various input signals to the microprocessor for engine condition monitoring. In this situation, the output signal would be directed to either a cockpit alarm (in the event of an aircraft) or maintenance panel, depending upon the nature and severity of a detect fault. The microprocessor to be used in an actual aircraft system would preferably be integrated into the electronic fuel control. Previous systems utilized fixed point switches which provided the pilot with warnings of impending disaster. In contrast, the system of the invention provides continuous on line monitoring of the system parameters to maintenance personnel so that trends in the operation of the system can be determined and preventative measures taken.

Figure 2:
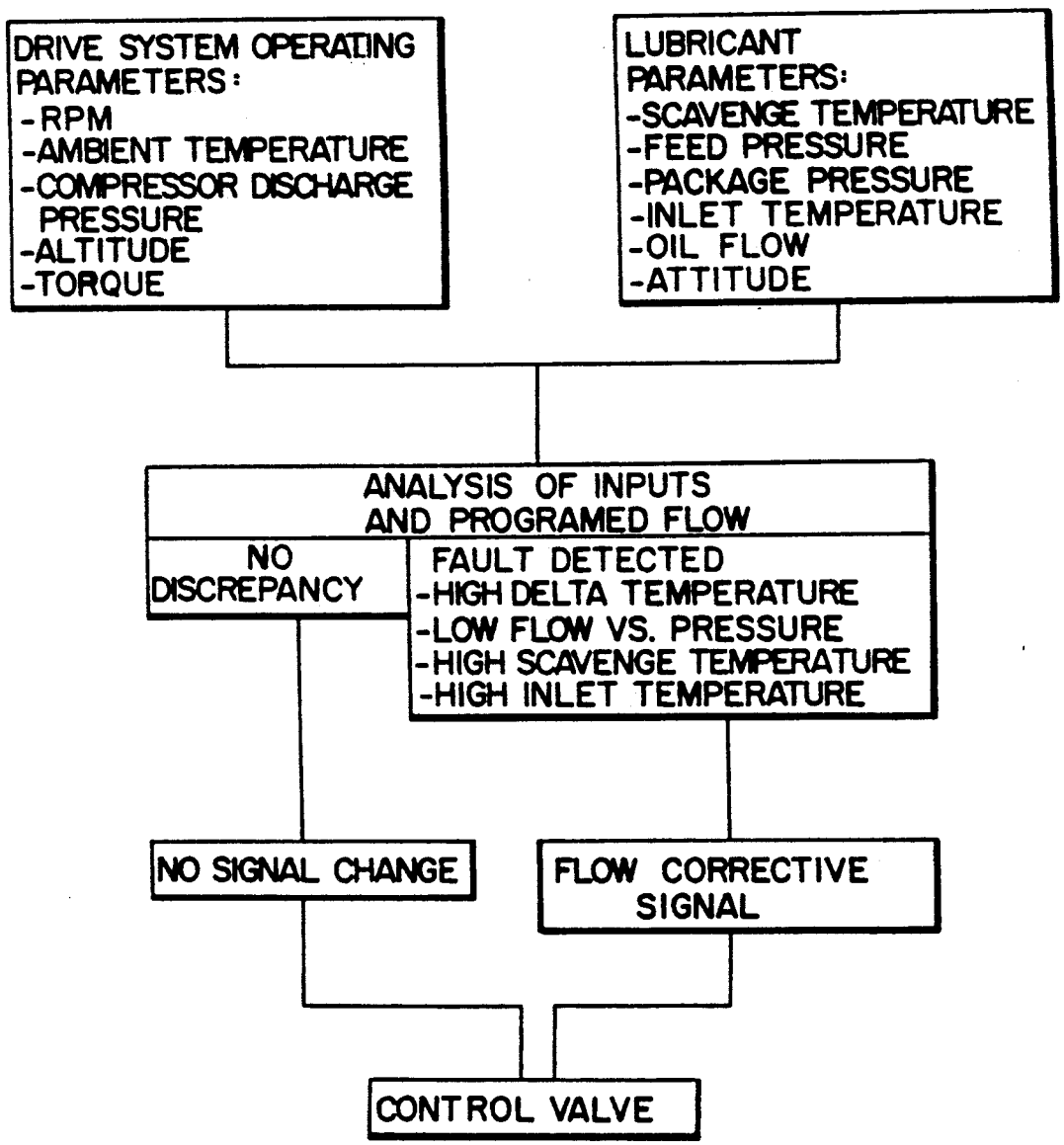
FIG. 2 is a schematic flow diagram of the operation of a flow management system which may be utilized with the automatic lubrication system illustrated in FIG. 1.

It will be appreciated that FIG. 1 represents a lubrication system which does not include all of the input and output information presented in FIGS. 2 and 3. In actual fact, studies have determined that scavenge temperature is an excellent determinant of the need for lubrication at a moving component such as a bearing package. Hence, that is what is presented in FIG. 1, but it is not intended that the invention be limited to that configuration alone.

With continued reference to FIG. 1, a computer 72 with accompanying power supply is seen to be responsive to signals from the thermocouples 48, 52 to operate the control valve mechanisms 46 in a manner which will be described. As was noted previously, any number of other inputs, or combinations of inputs, as presented in FIG. 2, to the computer 72 could be employed for the purpose of the invention. However, for a particular application which led to the present invention, scavenge temperature was found to be a preferable parameter to use.

Figure 4:
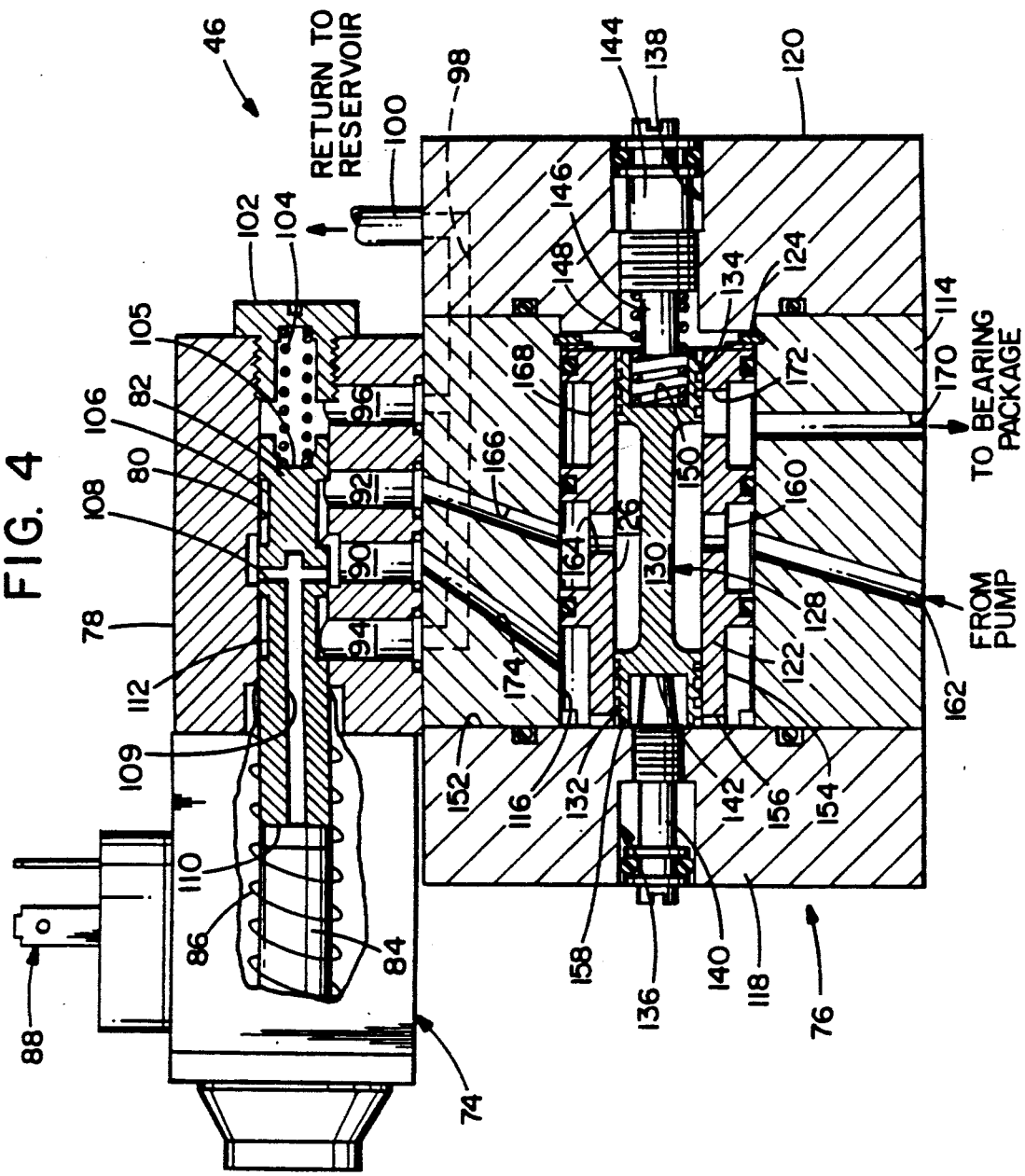
FIG. 4 is a side elevation view, certain parts being cut away and shown in section, illustrating a two-stage control valve mechanism which is utilized as an integral component of the automatic lubrication system of FIG. 1.

Turn now to FIG. 4 for a description of the two-stage control valve mechanism 46 which is a primary component of the automatic lubrication system of the invention. The control valve mechanism 46 includes a first stage solenoid valve 74 which operates to regulate the output pressure of lubricant to a second stage metering valve 76 according to a condition being experienced by the drive system 40. The first stage solenoid valve 74 includes a valve block 78 having an elongated bore 80 therein. A control pressure spool 82 is matingly received in the bore 80 and axially slidable in the bore. The term "matingly" is intended to mean that there is minimal leakage of lubricant from between the contiguous surfaces of the spool 82 and of the bore 80.

An armature 84 integral with the control pressure spool 82 is reciprocable relative to the valve block 78 according to the electrical field developed in the customary fashion by windings 86 within the solenoid valve 74. An input receptacle 88 enables electrical connection of the solenoid valve 74 to the computer and power supply 72. The output to the solenoid valve 74 is preferably dithered to provide a continuous cyclic current fluctuation superimposed upon a base direct current driver signal to cause a very small reciprocating motion of the control pressure spool 82 relative to the valve block 78. Such motion of the control pressure spool 82 minimizes hysteresis which can be inherent in low pressure proportional valving. As was previously mentioned, the control signal is computer generated by an algorithm which utilizes scavenge oil thermocouple input.

The valve block 78 is formed with a first outlet port 90 in communication with the second stage metering valve 76. The valve block 78 also includes an inlet port 92 positioned to receive pressurized lubricant from the pump 24. In one typical construction, oil is received at the inlet port 92 at a pressure of 100 psig and the pressure transmitted by the outlet port 90 is variable between 0 and 20 psig. Two additional outlet ports, 94, 96, are connected via a manifold 98 to a return line 100 for return of the lubricant to the reservoir 22.

Figure 5:
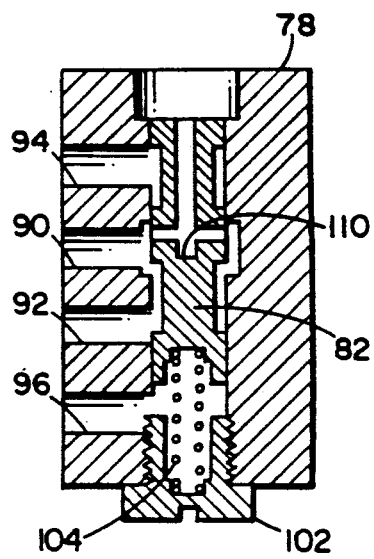
FIGS. 5, 6, and 7 are side elevation views, in section, illustrating a portion of a first stage solenoid valve, as illustrated in FIG. 4, depicting different operating positions thereof.
Figure 6:
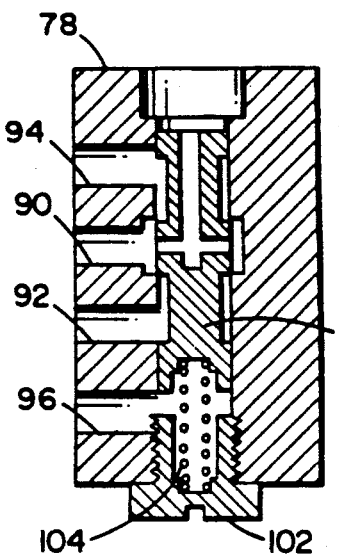

A plug 102 is threadedly joined to the valve block 78 at a tapped end of the bore 80. The plug 102 is recessed to receive one end of a compression spring 104, hereinafter referred to as a control pressure spring. The opposite end of the spring 104 is received in a spring seat 105 located at a free end of the control pressure spool 82. The spring 104 biases the spool 82 toward the left as seen in FIG. 4 and, indeed, the position illustrated in FIGS. 4 and 5 represent the position which the spool assumes in the absence of any other forced being applied. The control pressure spool 82 also includes a first annular duct 106 which serves to selectively connect the inlet port 92 and the first outlet port 90. This occurs when the spool is in the position illustrated in FIGS. 4 and 5. The spool 82 is also provided with a diametrically extending duct 108 and with an axial bore 109 which selectively connect the inlet port 92 and an operating surface 110 which is spaced from the spring seat 105.

When the control pressure spool 82 is in the position illustrated in FIGS. 4 and 5, pressurized lubricant impinges on the operating surface 110 via the annular duct 106, first outlet port 90, and diametrically extending duct 108, and serves to counteract the bias of the spring 104. To a substantial extent, the force of the fluid acting on the operating surface 110 counter balances the bias of the spring 104 enabling relatively small electrical signals to move the spool 82 by means of the armature 84 and windings 86.

The control pressure spool 82 has yet another annular duct 112 for selectively connecting the first outlet port 90 to the second outlet port 94. This occurs when the spool 82 assumes the position illustrated in FIG. 7. It will be appreciated that the third outlet port 96 is continuously connected to the manifold 98 so as to drain the region between the plug 102 and the spool 82 and to prevent any unintentional back pressure on the spool which would not be desirable.

With continued reference to FIG. 4, the second stage metering valve 76 includes a central block 114 having a first longitudinally extending bore 116 formed therein. A pair of opposed end blocks 118, 120 are suitably, sealingly, fixed to the central block 114 so as to substantially enclose the longitudinal bore 116. A main spool sleeve 122 is sealingly received in the longitudinal bore 116 and fixed against longitudinal movement relative to the central block 114, as by a snap ring 124. The main spool sleeve 122 itself has a longitudinal bore 126 which is coaxial with the bore 116.

A main metering spool 128 is comprised of an elongated connecting member 130 of reduced diameter terminating at opposed cup shaped members 132, 134 whose outer surfaces sealingly and slidingly engage the bore 126. The cavities of the cup shaped members 132, 134, face in opposite directions.

The end block 118 has a drilled, tapped, and counterbored through hole 136 which is axially aligned with the bore 126. In a similar fashion, the end block 120 has a drilled, tapped, and counterbored through hole 138 which is also axially aligned with the bore 126. A plug member 140 is threadedly and sealingly engaged with the through hole 136 and includes a nose portion which is engageable with an operating surface 142 of the main metering spool 128. A plug member 144 is threadedly and sealingly engaged with the through hole 138 and includes a nose portion of reduced diameter which extends in the direction of the main metering spool 128. A return spring 148 is coaxial with the nose portion 146 and extends between a shoulder on the plug member 144 and a spring seat 150 located in the cavity of the cup shaped member 134. The return spring 148 biases the main metering spool 12 to the position illustrated in FIGS. 4 and 8, that is, such that the extreme end of the cup shaped member 132 engages an abutting surface 152 of the end block 118. By reason of the fact that a nose end of the plug member 140 bears against the operating surface 142, the relative initial positioning between the main metering spool 128 and the central block can be obtained, as desired. In a similar manner, the plug member 144 can be adjusted to, in turn, adjust the force of the return spring 48 acting on the spring seat 150.

The main spool sleeve 122 is formed with an operating region annulus 154 which is in communication with the operating surface 142 via suitable openings 156, 158 in the main spool sleeve 122 and in the cup shaped member 132 as they mutually engage the abutting surface 152 of the end block 118. The main spool sleeve 122 is also formed with a lubricant inlet annulus 160 in communication with a system inlet port 162 in the central block 114 which, in turn, is connected to the main lubrication line 32 leading from the pump 24. Centrally located apertures 164 enable lubricant flow from the system inlet port 162 to proceed through an intermediate port 166, also in the central block 114, to the inlet port 92 in the valve block 78. The main spool sleeve 122 is also provided with a lubricant outlet annulus 168 which is in communication with a system outlet port 170 in the central block 114 through which lubricant flows to the appropriate component such as a bearing package 38 or 42. The sleeve 122 further includes an outlet aperture 172 immediately adjacent the outlet annulus 168 which, in conjunction with the cup shaped member 132, operates as a valve to selectively restrict or permit flow through the system outlet port 170.

Figure 8:
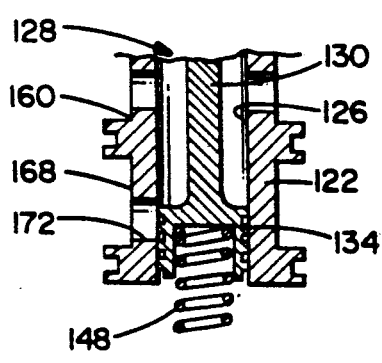
FIGS. 8 and 9 are detail side elevation views, in section, illustrating two operating positions, respectively, of a part of a second stage metering valve illustrated in FIG. 4.
Figure 9:
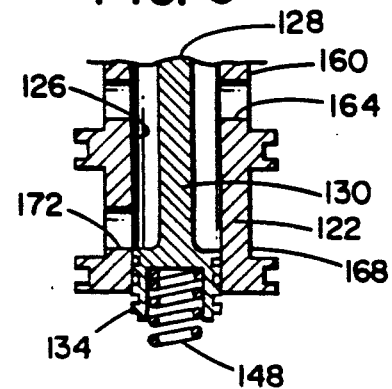

When the main metering spool 128 is in its extreme position, held against the abutting surface 152 by means of the return spring 148, the relative positions of the cup shaped member 134 and the outlet aperture 172 are as illustrated in FIGS. 4 and 8. In this position, the resulting flow is at a minimum, which is the minimal amount necessary to provide adequate lubrication to the bearing packages 38, 42. However, the main metering spool 128 is movable, as will be discussed below, to the right, to an extreme position as illustrated in FIG. 9, at which maximum flow is permitted through the outlet aperture 172 to the bearing packages.

OPERATION

Consider now the operation of the lubrication system of the invention and, particularly, of the control valve mechanism 46. Initially, assume that the drive system 40 is at operational speed and that a proper amount of lubricant is being drawn by the pump 24 from the reservoir 22 for delivery to the bearing packages 38, 42 in the customary manner. Thus, the pressurized lubricant is caused to flow through the system inlet port 162, through the intermediate port 166, the inlet port 92, annular duct 106, thence into outlet port 90. From outlet port 90, the flow of pressurized lubricant is divided. Some of the lubricant is caused to flow through the duct 108 so as to impinge on the operating surface 110, thereby moving the control pressure spool 82 to the right (FIG. 4) and against the bias of the spring 104. The remainder of the pressurized lubricant is caused to flow through an intermediate port 174 in the central block 114, through the operating region annulus 154, openings 156, 158, thence to impinge against the operating surface 142 at an end of the main metering spool 128. This flow of the pressurized lubricant causes the metering spool 128 to move to the right (FIG. 4) against the bias of the return spring 148.

Under normal operating conditions, the force of lubricant acting on the operating surface 110 is substantially equivalent to the force of the control pressure spring 104 acting against the spring seat 105. With the positioning of the control pressure spool 82 illustrated in FIG. 4, a maximum pressure of 20 psig, for example, may occur in the outlet port 90 resulting from an operating pressure of 100 psig present in the inlet port 92. This results in the movement of the main metering spool 128 to the extreme right hand position (as seen in FIG. 9) thereby compressing the return spring 148 and allowing maximum flow of lubricant to the bearing package via system outlet port 170.

As previously noted, the thermocouples 48 and 52 continually inform the computer 72 of the temperature of the lubricant in the scavenge lines 50 and 54, respectively. In the event the temperature of the lubricant in the scavenge lines is less than a value for which the system has been designed, the computer 72 is so notified and directs an appropriate output to the electrical input receptacle 88. This causes movement of the control pressure spool 82 to the right (FIGS. 4–7). When the spool 82 reaches an intermediate position at which the first outlet port 90 is closed to either inlet port 92 or outlet port 94, the pressure in the outlet port 90 is substantially reduced. Indeed, the pressure of lubricant in the port 90 results from a combination of leakage into that port from the inlet port 92 and out of that port to the outlet port 94. When this occurs, the diminished fluid pressure causes the return spring 148 to overpower the remaining fluid behind the operating surface 142 thereby moving the main metering spool 128 to the left (FIGS. 4, 8, and 9) until a position substantially intermediate FIGS. 8 and 9 is achieved. When this occurs, the flow of lubricant through the outlet aperture 172 is reduced from the earlier situation described, but continues to remain above the minimum requirement of the drive system.

Figure 7:
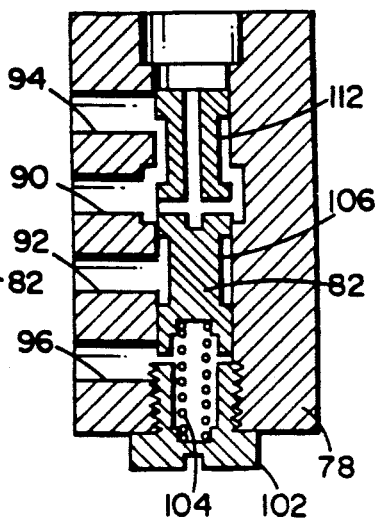

In the event the thermocouples 48, 52 experience even lower temperatures than previously, the computer 72 continues to react to that information and signals the solenoid valve 74 to move the control pressure spool 82 to the position indicated in FIG. 7. In this instance, the control pressure spring 104 is substantially completely compressed; the inlet port 92 is totally blocked; and the pressure in the outlet port 90, and with it the pressure acting on the operating surface 142 of the main metering spool 128 is reduced to zero and lubricant within the operating region permitted to flow, via the outlet port 94 through the manifold 98 and the return line 100 to the reservoir 22. In this instance, the main metering spool 128 moves farthest to the left (FIG. 8), such that the outlet aperture 172 allows flow of only the minimum amount of lubricant for which the system is designed.

While a preferred embodiment of the invention has been disclosed in detail, it should be understood by those skilled in the art that various other modifications may be made to the illustrated embodiments without departing from the scope of the invention as described in the specification and defined in the appended claims.

We claim:

1. An automatic self compensating flow control lubrication system for continuously supplying the requisite amount of lubricant to at least one moving component of a drive system comprising:
    delivery means for supplying the lubricant from a reservoir to the moving component and for returning the lubricant to the reservoir;
    sensor means for detecting an operating parameter being encountered by the drive system and operable to generate signals proportional to deviations from a predetermined value of such operating parameter;
    valve means operatively associated with said delivery means for regulating the flow of lubricant to the moving component; and
    computer means responsive to the signals from said sensor means for operating said valve means to obtain a predetermined flow of the lubricant to the moving component necessary to return the operating parameter to the predetermined value;
    said valve means including:
    a first stage solenoid valve responsive to said computer means for regulating the output pressure of lubricant therefrom to a second stage metering valve according to a condition being experienced by said drive system and movable between a first position at which the pressure of the lubricant output is at maximum and a second position at which the pressure of the lubricant output is at minimum; and
    a second stage metering valve for receiving pressurized lubricant from said delivery means and for directing flow of the pressurized lubricant to said moving component, said second stage metering valve being movable in response to operation of said first stage solenoid valve, between a minimum flow position allowing minimum flow of the lubricant to the moving component when said first stage solenoid valve is in said second position and a maximum flow position allowing maximum flow of the lubricant to the moving component when said first stage solenoid valve is in said first position.

2. An automatic lubrication system as set forth in claim 1 wherein said first stage solenoid valve includes:
    an inlet port for receiving pressurized lubricant from said delivery means;
    an elongated, generally cylindrical, control pressure spool having a spring seat at one end and an operating surface at an opposite end, said control pressure spool being movable between said first position and said second position;
    a control pressure spring engaged with said spring seat biasing said control pressure spool toward said first position; and
    a first outlet port in communication with said second stage metering valve;
    said control pressure spool including first duct means for selectively connecting said inlet port and said first outlet port, and second duct means for selectively connecting said inlet port and said operating surface of said control pressure spool such that pressurized lubricant acting on said operating surface of said control pressure spool biases said control pressure spool, against said control pressure spring, toward said first position.

3. An automatic lubrication system as set forth in claim 2
    wherein said first stage solenoid valve has a second outlet port for return of the lubricant to the reservoir; and
    wherein said control pressure spool has third duct means for selectively connecting said first outlet port to said second outlet port.

4. An automatic lubrication system as set forth in claim 2 wherein said second stage metering valve includes:
    a system inlet port for receiving pressurized lubricant from said delivery means;
    a system outlet port for delivery of the pressurized lubricant to the moving component;
    an elongated, generally cylindrical, main metering spool having a spring seat at one end, an operating surface at an opposite end, and a valve gate generally proximate to said system outlet port for controlling flow of the pressurized lubricant to the moving component, said main metering spool being movable between said minimum flow position at which said valve gate substantially, but not completely, covers said system outlet port and said maximum flow position at which said valve gate substantially uncovers said system outlet port; and
    a return spring engaged with said spring seat biasing said main metering spool toward said minimum flow position;
    the pressurized lubricant output of said first stage solenoid valve acting upon said operating surface of said main metering spool biasing said main metering spool toward said maximum flow position.

5. An automatic lubrication system as set forth in claim 4
    wherein said first stage solenoid valve includes:

a solenoid valve block having an elongated bore therein, said control pressure spool matingly received in the bore and slidable axially therein; and an armature integral with said control pressure spool responsive to said computer means to move said control pressure spool against the bias of said control pressure spring;

said first and third duct means being annular grooves at longitudinally spaced locations along said control pressure spool;

said second duct means being a diametrical bore through said control pressure spool intermediate said first and third duct means.

6. An automatic lubrication system as set forth in claim 5 including a plug threadedly joined to said solenoid valve block at an end of the elongated bore and spaced from said control pressure spool, said control pressure spring extending between said spring seat and said plug.

7. An automatic lubrication system as set forth in claim 6 wherein said first stage solenoid valve has a third outlet port for return to the reservoir of the lubricant from the region between said valve seat and said plug.

8. An automatic lubrication system as set forth in claim 7 wherein the inlet port and the first, second, and third outlet ports are provided in said solenoid valve block.

9. An automatic lubrication system as set forth in claim 4
wherein said second stage metering valve includes:
a central block having a first longitudinally extending bore therein;
first and second end blocks fixed to said central block substantially enclosing the first longitudinal bore;
a main spool sleeve sealingly received in the first longitudinal bore and fixed against longitudinal movement relative to said central block, said main spool sleeve having a second longitudinal bore therein generally coaxial with the first longitudinal bore, said main spool sleeve having an operating region annulus in communication with said operating surface of said main metering spool, a lubricant inlet annulus in communication with said system inlet port, and a lubricant outlet annulus in communication with said system outlet port, said annuli being longitudinally spaced on said main spool sleeve.

10. An automatic lubrication system as set forth in claim 8 including first adjustment means for incrementally moving said main metering spool to selectively establish said minimum flow position.

11. An automatic lubrication system as set forth in claim 8 including second adjustment means for incrementally adjusting the force of said return spring biasing said main metering spool toward said minimum flow position.

12. An automatic lubrication system as set forth in claim 1
wherein said delivery means includes:
a delivery line for conducting lubricant to the moving component from the reservoir;
a scavenge line for conducting lubricant to the reservoir from the moving component; and
pump means for initiating and maintaining flow of lubricant in said delivery line and in said scavenge line.

13. An automating lubrication system as set forth in claim 12
wherein said sensor means is a thermocouple for sensing the temperature of the lubricant flowing in said scavange line.

14. A valve mechanism for regulating the flow of lubricant to a moving component of a drive system according to deviations being sensed from a predetermined value of an operating parameter, said valve mechanism comprising:
a first stage solenoid valve responsive to sensed deviations from the predetermined value of the operating parameter for regulating the output pressure of lubricant therefrom to a second stage metering valve and movable between a first position at which the pressure of the lubricant output is at maximum and a second position at which the pressure of the lubricant output is at minimum; and
a second stage metering valve for directing flow of the pressurized lubricant from a source of pressurized lubricant to said moving component, said second stage metering valve being movable in response to operation of said first stage solenoid valve, between a minimum flow position allowing minimum flow of the lubricant to the moving component when said first stage solenoid valve is in said second position and a maximum flow position allowing maximum flow of the lubricant to the moving component when said first stage solenoid valve is in said first position;
said first stage solenoid valve including:
an inlet port for receiving pressurized lubricant from the source of pressurized lubricant;
an elongated, generally cylindrical, control pressure spool having a spring seat at one end and an operating surface at an opposite end, said control pressure spool being movable between said first position and said second position;
a control pressure spring engaged with said spring seat biasing said control pressure spool toward said first position; and
a first outlet port in communication with said second stage metering valve;
said control pressure spool including first duct means for selectively connecting said inlet port and said first outlet port, and second duct means for selectively connecting said inlet port and said operating surface of said control pressure spool such that pressurized lubricant acting on said operating surface of said control pressure spool biases said control pressure spool, against said control pressure spring, toward said first position.

15. A valve mechanism as set forth in claim 14
wherein said first stage solenoid valve has a second outlet port for return of the lubricant to the reservoir;
wherein said control pressure spool has third duct means for selectively connecting said first outlet port to said second outlet port; and
wherein second stage metering valve includes:
a system inlet port for receiving pressurized lubricant from said delivery means;
a system outlet port for delivery of the pressurized lubricant to the moving component;
an elongated, generally cylindrical, main metering spool having a spring seat at one end, an operating surface at an opposite end, and a valve gate generally proximate to said system outlet port for controlling flow of the pressurized lubricant to the moving component, said main metering spool being movable between said minimum flow position at which said valve gate substantially, but not completely, covers said system outlet port and said maximum flow position at which said valve gate substantially uncovers said system outlet port; and a return spring engaged with said spring seat biasing said main metering spool toward said minimum flow position;

the pressurized lubricant output of said first stage solenoid valve acting upon said operating surface of said main metering spool biasing said main metering spool toward said maximum flow position.

16. An automatic lubrication system as set forth in claim 15 including first adjustment means for incrementally moving said main metering spool to selectively establish said minimum flow position.

17. An automatic lubrication system as set forth in claim 15 including second adjustment means for incrementally adjusting the force of said return spring biasing said main metering spool toward said minimum flow position.

* * * * *